United States Patent
Cremonesi et al.

[11] Patent Number: 5,196,935
[45] Date of Patent: Mar. 23, 1993

[54] METHOD AND AN APPARATUS FOR REDUCING NOISE OF THE PULSIVE TYPE IN DIGITAL VIDEO RECEIVER SETS

[75] Inventors: Alessandro Cremonesi, Milan; Franco Cavallotti, Turin; Gianguido Rizzotto, Milan, all of Italy

[73] Assignee: SGS-Thomson Microelectronics S.r.l., Milano, Italy

[21] Appl. No.: 630,511

[22] Filed: Dec. 20, 1990

[30] Foreign Application Priority Data

Dec. 22, 1989 [IT] Italy .................... 22835 A/89

[51] Int. Cl.$^5$ ........................................... H04N 5/213
[52] U.S. Cl. ...................................... 358/167; 358/37
[58] Field of Search .............. 358/160, 167, 166, 36, 358/21 R, 163, 37; 375/103

[56] References Cited

U.S. PATENT DOCUMENTS

| | | | |
|---|---|---|---|
| 4,498,104 | 2/1985 | Schulz | 358/160 |
| 4,517,600 | 5/1985 | Reitmeier | 358/166 |
| 4,605,966 | 8/1986 | Collins | 358/167 |
| 4,675,735 | 6/1987 | Wilkinson et al. | 358/160 |
| 4,876,595 | 10/1989 | Veldhuis | 358/167 |
| 5,027,209 | 6/1991 | Nishimura et al. | 358/167 |

OTHER PUBLICATIONS

"Worldwide National Television and Electricity Supply Standards", Image Technology, Feb. 1989, pp. 74, 75.

Primary Examiner—Victor R. Kostak
Assistant Examiner—Jeffrey S. Murrell
Attorney, Agent, or Firm—Rosen, Dainow & Jacobs

[57] ABSTRACT

The invention relates to a method for reducing noise of the pulsive type in digital video receiver sets. The method consists of picking up a noise-affected sample of a video signal and replacing it with a weighted average of samples located in the contour thereof; this allows the noise component to be fittered out with a lower load, in terms of circuit complexity, on the TV set.

5 Claims, 3 Drawing Sheets

METHOD AND AN APPARATUS FOR REDUCING NOISE OF THE PULSIVE TYPE IN DIGITAL VIDEO RECEIVER SETS

DESCRIPTION

This invention relates to a method for reducing noise of the pulsive type in digital video receiver sets.

The invention is also related to an apparatus for implementing the method.

It is a known fact that a receiver of TV signals may be regarded to be schematically composed of the following sub-systems: a display or video screen connected downstream from a signal converter for conversion from luminance/chrominance coding to trichromatic RGB (Red, Green, Blue) coding, and a chromatic demodulator connected serially to the converter and to the output of a luminance/chrominance separator.

Provided upstream of the luminance separator is a demodulator whereto a composite video signal is input. Where the video receiver is of the so-called digital type, also required are an analog-to-digital conversion of the signal demodulated at an intermediate frequency, and a corresponding digital-to-analog conversion before the signal reaches the display.

In general, a noise reducer is also provided between the demodulator and the luminance separator in order to enhance the quality of the signal received.

In fact, pulsive noise is nearly always present in video broadcasts which manifests, in the instance of video receivers, as white spots and/or lines on the picture.

Pulsive noise may be due to a number of causes: for example, it may originate from poor weather conditions at the receiving site, or from household appliance motors radiating energy to the ambient within the band of the video signal.

In all cases, these pulses, being of wide amplitude and short duration, will overlap the video signal to alter its characteristics and impair the fidelity of the displayed picture.

This disturbance, besides being quite objectionable, is also harmful to proper operation of the TV set.

In fact, digital receivers usually include logic components which process the video signal by algorithms directed to improve the signal quality, e.g. for enhancing the picture contours. However, these algorithms may interpret the noise as different frequency components of the signal itself, thereby enhancing them and degrading the demodulated picture.

The prior art proposes several approaches to obviating the appearance of such effects or pulsive noise.

One solution consists of using filters of the so-called medial type.

However, that solution has shown to be inadequate to ensure high quality for the picture under all the operating conditions of the video receiver, and hence, with different standards of TV broadcasting.

The technical problem underlying this invention is to provide a method and an apparatus for reducing pulsive noise in digital video receiver sets, which have respective functional and structural characteristics effective to reduce to a considerable extent the effects of noise on the video picture with different broadcasting standards, while keeping the complexity of the receiver circuitry, and hence production costs, low.

The solutive idea on which this invention stands is that of applying non-linear filtering of the FIR (Finite Impulse Response) type to the composite video signal.

Based on this solutive idea, the technical problem is solved by a method as indicated consisting of picking up a noise-affected sample of a composite synchronism video signal and substituting, for said sample, a weighted average of samples lying within a range thereof.

This technical problem is also solved by an apparatus for reducing noise of the pulsive type in digital video receiver sets operating on a composite synchronism video signal, being characterized in that it comprises means of picking up the noise-affected pulsive portion of said signal, and second means for computing an average value from sampled impulses bounding said noise impulse and comparing said average value to the value of said noise.

The features and advantages of the method and apparatus according to the invention will become apparent from the following detailed description of embodiments thereof, to be taken by way of illustration and not of limitation with reference to the accompanying drawings, where:

Figure 1:
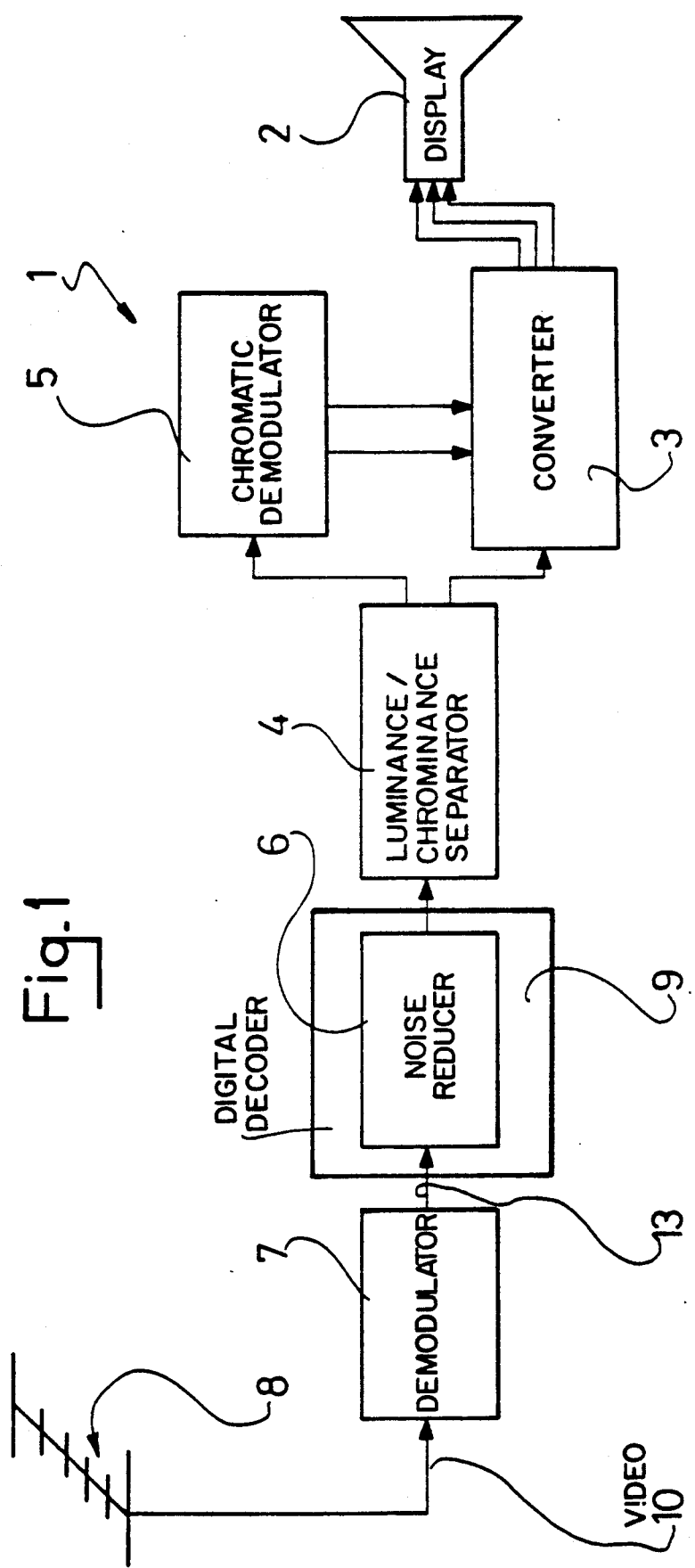
FIG. 1 is a block diagram depicting schematically a video receiver which incorporates a noise reducer according to this invention.
Figure 2:
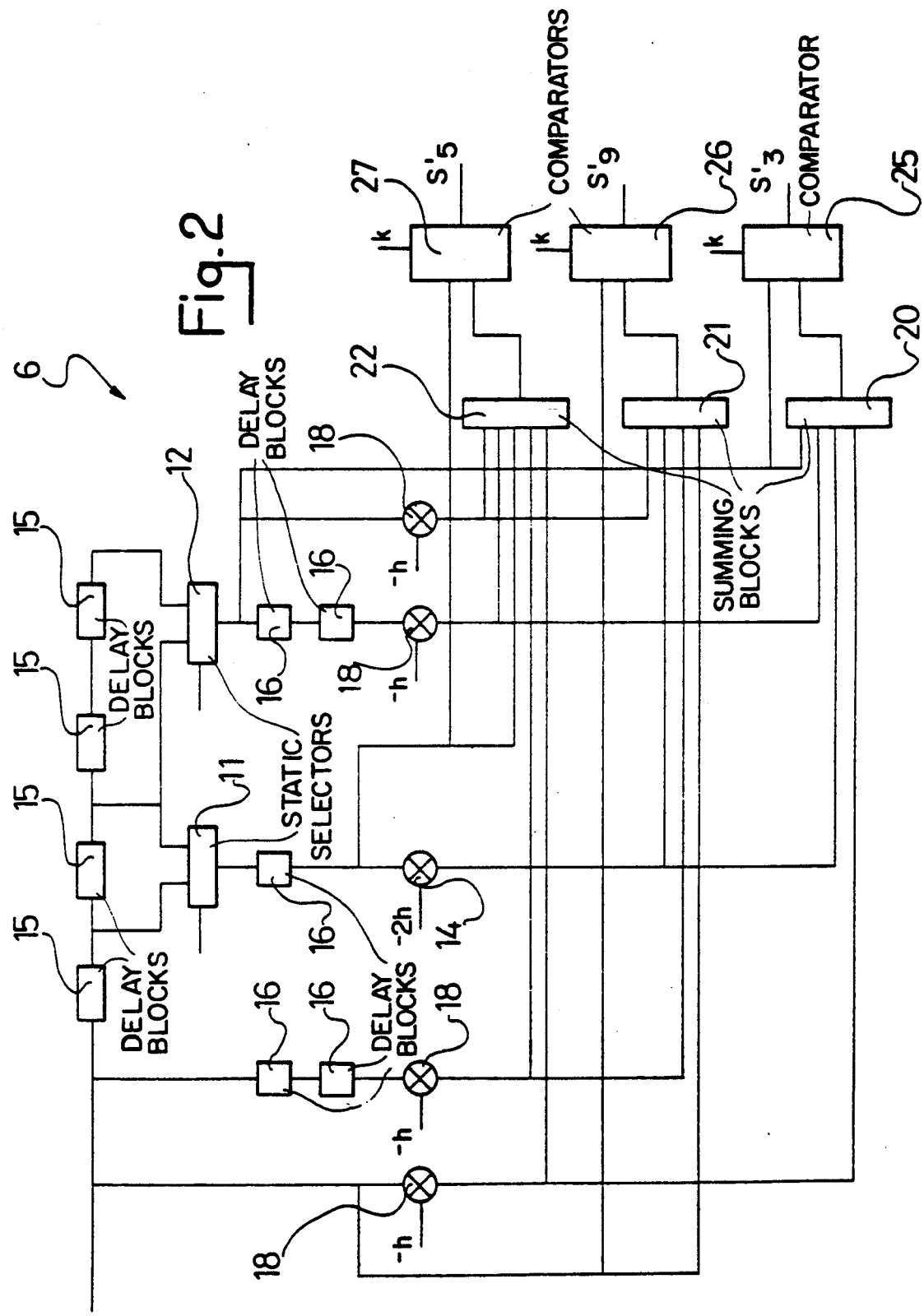
FIG. 2 is a circuit diagram of the noise reducer of this invention.

With reference to the drawing figures, generally and schematically indicated at 1 is a video receiver set of the digital type, incorporating a noise reducer 6 according to the invention.

The receiver 1 comprises a video screen or display 2, which is to receive, from a converter 3 of the RGB type, electric signals corresponding to a broadcast picture.

The converter 3 has its input connected to the output of a luminance/chrominance separator 4; that output is also connected to the input of a chromatic demodulator 5 for the color difference components.

Provided upstream of the separator 4 is a noise reducer 6 embodying this invention, which is connected downstream from a demodulator 7 being input a video signal 10 to be demodulated from an aerial 8.

Understandably, there are also provided an analog-to-digital converter between the demodulator 7 and the noise reducer 6, and a digital-to-analog converter directly upstream of the display 2.

The noise reducer 6 is adapted to operate on different TV broadcasting standards, specifically the PAL and NTSC standards.

In this regard, the reducer 6 is incorporated to a digital decoder 9 adapted to carry out a sampling on the video signal 13 from the demodulator 7. This base-band, composite signal 13 is sampled at a frequency fc which is four times as high as a frequency fs of the color sub-carrier (i.e., fc=4fs).

The digital conversion of the sampled video signal 13 will be denoted hereinafter by s9, for any time t.

The noise reducer 6 comprises first 11 and second 12 static selectors to suit the PAL or NTSC TV standards.

The first selector 11 has a pair of inputs and receives on one the sampled video signal S9, via a delay block 15 adapted to introduce a so-called line delay, and on the other, again the sampled signal S9 but as affected by a double line delay due to it going through a second block 15. This signal, as affected by a double delay, is also applied to one input of the second selector 12, which is receiving on the other input this same signal as affected, however, by two further line delays from two more blocks 15.

The reducer 6 further comprises a first summing block 20, which has a first input connected to the output of the second selector 12, a second input connected, in turn, to the output of the selector 12 through a series pair of delay blocks 16 and a multiplier node 18. Each of the blocks 16 is adapted to apply, to the signal S3 being output by the selector 12, a delay corresponding to two pixels, whilst the node 18 is adapted to multiply the digital signal S3 by a constant h equal to $-\frac{1}{4}$.

A third input of the summing block 20 is connected to the first selector 11 output, on which a signal S6 is present, through a series delay block 16 and multiplier node 14, the latter being adapted to multiply the signal S6 by a constant 2h equal to $-\frac{1}{2}$.

A fourth input of the summing block 20 receives the sampled signal S9 as multiplied by a constant h through a multiplier node 18.

The summing block 20 has its output connected to one input of a comparator device 25 having the other input connected to the output of the second selector 12. The comparator 25 also has a threshold input on which a signal having a value K is present which corresponds to a rated coefficient on the TV set control according to the noise feature of the channel being received and defining a noise pick-up threshold in a predetermined fashion.

On the output of the comparator 25, there is present a signal, denoted S3', which is given by the following formula:

$$S3' = \begin{cases} S3 \text{ if } S3 - 1/2(S5) - 1/4(S1 + S9) < K \\ 1/4(S1 + S9) + 1/2(S5) \text{ if } \\ S3 - 1/2(S5) - 1/4(S1 + S9) > K \end{cases} \quad (A)$$

The noise reducer 6 further comprises a second summing block 21 having a first input which receives the sampled video signal S9 directly. A second input of the summing block 21, in turn, receives the signal S9, but through a series pair of delay blocks 16 and multiplier node 18 effective to multiply the signal by the constant h.

A third input of the summing node 20 is connected to the output of the first selector 11 through a series delay block 16 and multiplier node 14, while a fourth input is connected to the output of the second selector 12 through a multiplier node 18.

The summing node 21 has its output connected to one input of a second comparator 26 which receives the composite signal S9 on the other input. This comparator 26 also has a threshold input on which a signal of value K is present, whilst on the output of this comparator is a signal, denoted S9', which is given by the following formula:

$$S9' = \begin{cases} S9 \text{ if } S9 - 1/4(S3 + S7) - 1/2(S5) < K \\ 1/2(S5) + 1/4(S3 + S7) \text{ if } \\ S9 - 1/4(S3 + S7) - 1/2(S5) > K \end{cases} \quad (B)$$

The structure of the reducer 6 is completed by a further summing block 22 having a first input which receives the signal S9 through a multiplier node 18, and a second input which receives this same signal S9 through a series of a delay block pair 16 and a similar multiplier 18.

A third input of the summing block 22 is connected to the output of the first selector 11 via a delay block 16, whilst a fourth input is connected to the output of the second selector 12 via a series of a delay block pair 16 and multiplier node 18.

This summing block 22 has a fifth input connected to the output of the second selector 12 via a further multiplier node 18. The output of the summing block 22 is connected to one input of a third comparator 27 having the other input connected to the output of the first selector via a delay block 16. The latter comparator 27 has, in turn, a threshold input K, with a signal, denoted S5', being applied to the output thereof which is given by the following formula:

$$S5' = \begin{cases} S5 \text{ if } S5 - 1/4(S1 + S3 + S7 + S9) < K \\ 1/4(S1 + S3 + S7 + S9) \text{ if } \\ S5 - 1/4(S1 + S3 + S7 + S9) > K \end{cases} \quad (C)$$

The structure of the apparatus described hereinabove allows by itself the implementation of the method according to the invention.

Assuming at first a TV signal to the NTSC standard, as sampled over a period T=1/fc=1/4fs, this signal may be identified by the following expression:

$$S(nT) = Y(nT) + Q(nT) \sin(n\pi/2) + I(nt) \cos(n\pi/2) \quad (1)$$

where, n is the number of the display 2 lines, Y is the luminance component, and Q and I are the chromatic components of the video signal.

Figure 4:
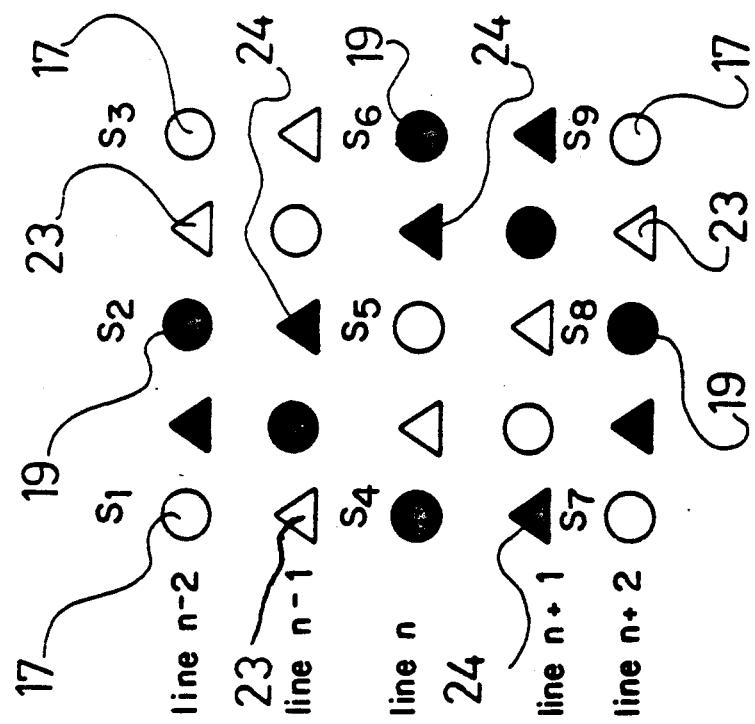

Considering that with the NTSC standard the signal subcarrier will shift each line by $\pi$, it may be seen that for each line of the display there will occur successive samples, or pixels, shown schematically in FIG. 4.

The chart of FIG. 4 has been obtained by associating the same graphic symbol with each sample having the same chrominance component; for example, associating a white circle 17 with the component Y+Q, a black circle 19 with Y−Q, a white triangle 23 with Y+I, and a black triangle 24 with Y−I.

The method of this invention consists of first picking up the pulsive portion of the signal which is affected by the noise, and then locating the pixel affected by the noise in the sampled video signal.

The pick-up step consists of defining a sampling matrix for the chrominance components of the video signal, wherein the central pixel corresponds to the value of the pulsive noise. This method further comprises the computation of a weighted average of the sampled impulses bounding the central pixel contour.

This pixel is subsequently replaced with the average of of the other impulses or presumably correct pixels.

In general, an erroneous pixel—meaning the pixels affected by noise—will be surrounded and bound by correct pixels.

According to the invention, during the sampling step, the central pixel of an n by m pixel matrix is monitored. The matrix is selected to have the smallest possible dimensions in order for the signal to vary least therein.

With the NTSC standard, the selected matrix has a size of 3×5 and is shown in FIG. 4.

Likewise, with the PAL standard, the sampled TV signal of period T would be identified by the following expression:

$$S(nT) = Y(nT) + U(nT)\sin(n\pi/2) + V\cos(n\pi/2) \quad (2)$$

Thus, as n varies, there will occur a sequence of samples of the type Y+U, Y−V, Y−U, and Y+V, with a periodicity of four samples.

Figure 3:
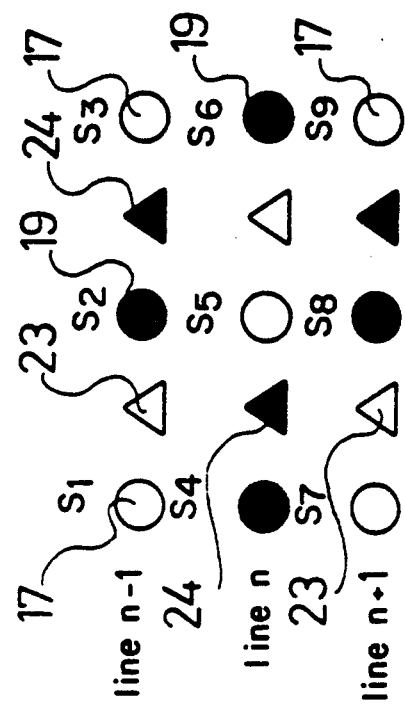
FIGS. 3 and 4 show respective matrix charts as used on the basis of the operating principle of the noise reducer shown in FIG. 2.

The chart of FIG. 3 has been obtained by associating the same graphic symbol with each sample having the same chrominance component; for example, associating a white circle 17 with the component Y+U, a black circle 19 with Y−U, a white triangle 23 with Y+V, and a black triangle 24 with Y−V.

The vertical periodicity of the TV signal to the PAL standard shifts each line by $\pi/2$, thereby the period will be doubled with respect to the NTSC standard, and the matrix to be selected will be lengthened in the vertical direction and have a size of 5×5 as shown in FIG. 3.

For each of the matrices shown in FIGS. 3 and 4, the noise reducer 6 will compute the average of the four contour values, i.e. at the matrix vertices, as well as the difference between this mean value and the value of the sample or pixel under examination, i.e. at the matrix center.

If the value of the central pixel is affected by noise, is replaced with the average of the other four.

That is, if the difference between the pixel and the average of the four neighboring pixels is greater than the predetermined threshold value K, present on the comparators 25, 26 and 27, relatively to the average of the four contour values, that pixel will be replaced with that average value.

The quality of the picture displayed is significantly affected by the value K, to be adjusted by the user. If the value K is set by the user at a specially low threshold level, the video receiver will be free of pulsive noise, but small high-frequency details will be lost.

Conversely, if the value K is too high, a certain level of low-energy pulsive noise will go through unaltered, but the finest picture details will be retained.

For completeness of illustration, it should be pointed out that the digital decoder 9 is to operate simultaneously on pixels related to three different lines, in order to also process the signal vertically.

Accordingly, the noise reducer 6 will also perform a comparison on the values of the end samples of the respective matrices.

For such samples, however, there are not another four values which can be regarded as equidistant in the matrix, and the average of the other four contour values shall have to be a weighted average as specified in the formulae (B) and (C), that is, to include three values at the matrix vertices and the matrix central value.

We claim:

1. An apparatus for reducing noise of the pulsive type in a color signal having a color sub-carrier in digital video receiver sets operating on a composite synchronism video signal and operating according to PAL or NTSC, standards comprising means for picking up and sampling at a frequency four times the frequency of the color sub-carrier the noise-affected pulsive portion of said signal, means for defining a sample matrix for chrominance components of the video signal wherein a central value corresponds to said noise-affected sample, and means for computing a fixed and predetermined point matrix as the average value from sampled impulses bounding a noise impulse and comparing said average value to the value of said noise impulse, said means for picking up comprising first and second static selectors having inputs to receive a sampled video signal, each via respective predetermined delay blocks effective to apply a line delay to the signal, and outputs connected to further delay blocks so as to define a matrix of sampling values corresponding to chrominance components of the video signal.

2. An apparatus for reducing noise of the pulsive type in a color signal having a color sub-carrier in digital video receiver sets operating on a composite synchronism video signal and operating according to PAL or NTSC standards comprising means for picking up and sampling at a frequency four times the frequency of the color sub-carrier the noise-affected pulsive portion of said signal, means for defining a sample matrix for chrominance components of the video signal wherein a central value corresponds to said noise-affected sample, and means for computing a fixed and predetermined point matrix as the average value from sampled impulses bounding a noise impulse and comparing said average value to the value of said noise impulse, said means for picking up comprising a group of summing blocks having respective outputs connected to inputs of a corresponding comparator, each summing block having respective inputs to receive a plurality of sampling signals picked up from the contour of said pulsive noise portion, and each of said comparators receiving on another input a sampling signal corresponding to said noise impulse.

3. A method for reducing noise of the pulsive type in digital video receiver sets operating on a composite video signal and operating at PAL or NTSC standards, comprising the steps of:
   picking up and sampling at a frequency four times the frequency of the color subcarrier pulsive portions of the signal affected by the noise;
   the step of picking up pulsive portions comprises the steps of:
   defining a sampling matrix for chrominance components of the video signal having a central pixel with a central value which corresponds to the pulsive noise;
   computing the average of the values at the four matrix vertices bounding the central pixel;
   computing the difference between the average value and the value of the central pixel;
   replacing the central pixel with the average value if the difference between the pixel and the average value of the four neighboring pixels is greater than a predetermined threshold value.

4. An apparatus for reducing noise of the pulsive type in digital video receiver sets operating on a composite synchronism video signal, comprising means for picking up and sampling the noise-affected pulsive portion of said signal, and means for computing the average value of sampled impulses bounding the noise sample and comparing said average value to the value of said noise sample, said means for picking up comprising first and second static selectors having inputs to receive a sampled video signal, each via respective predetermined delay blocks effective to apply a line delay to the signal, and having outputs connected to further delay blocks so as to define a matrix of sampling values corresponding to chrominance components of the video signal.

5. An apparatus for reducing noise of the pulsive type in digital video receiver set operating on a composite synchronism video signal, comprising means for picking up and sampling the noise-affected pulsive portion of said signal, and means for computing the average value of sample impulses bounding the noise sample and comparing said average value to the value of said noise sample, said means for computing comprising a group of summing blocks having respective outputs connected to inputs of a corresponding comparator, each summing block having respective inputs to receive a plurality of sampling signals picked up from the contour of said noise-affected pulsive portion, and each of said comparators receiving on another input a sampling signal corresponding to said noise sample.

* * * * *